(12) United States Patent
Bergano et al.

(10) Patent No.: US 7,336,908 B2
(45) Date of Patent: Feb. 26, 2008

(54) OPTICAL TRANSMISSION SYSTEM USING OPTICAL SIGNAL PROCESSING IN TERMINALS FOR IMPROVED SYSTEM PERFORMANCE

(75) Inventors: Neal S. Bergano, Lincroft, NJ (US); Alexei N. Pilipetskii, Colts Neck, NJ (US); M. Imran Hayee, Columbia, MD (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 11/530,270

(22) Filed: Sep. 8, 2006

(65) Prior Publication Data

US 2007/0009265 A1    Jan. 11, 2007

Related U.S. Application Data

(62) Division of application No. 09/850,600, filed on May 7, 2001.

(51) Int. Cl.
*H04B 10/06* (2006.01)
(52) U.S. Cl. .................. 398/208; 398/155; 398/212
(58) Field of Classification Search ........... 398/155, 398/208, 212
See application file for complete search history.

(56) References Cited

U.S. PATENT DOCUMENTS 5,229,876 A * 7/1993 Fatehi et al. .............. 398/157

(Continued)

FOREIGN PATENT DOCUMENTS

| EP | 0562514 | 9/1993 |
|---|---|---|
| EP | 0772308 | 5/1997 |

OTHER PUBLICATIONS

Morita, Itsuro et al., "40 Gbit/s Single-Channel Soliton Transmission Using Periodic Dispersion Compenstion", IEICE Transactions on Electronics, Institute of Electronics Information and Comm Eng., Tokyo, Japan, vol. E81-C, No. 8, Aug. 1998, pp. 1309-1315.

(Continued)

*Primary Examiner*—Leslie Pascal
(74) *Attorney, Agent, or Firm*—Grossman, Tucker, Perreault & Pfleger, PLLC

(57) ABSTRACT

An optical communication system configured to operate with optical signals at lower signal to noise ratios than previously contemplated. The communication system includes a receiver having an optical pre-processor coupled between a demultiplexer and a detector. The optical pre-processor includes either an optical polarization section having a polarization rotator and an optical polarizer, a phase modulation section that includes a phase modulator and a dispersion element and a clock recovery circuit, or an amplitude modulation section that includes an amplitude modulator clock recovery circuit and a spectral shaping filter. A method of communication includes transmitting an optical signal into the system and receiving the signal at a reduced signal-to-noise ratio through a transmission media, demultiplexing the optical transmission signal into a first optical signal, and pre-processing the first optical signal to form a first pre-processed signal by either rotating a polarization of the first optical signal, compressing a pulse in the first optical signal, or modulating an amplitude of a pulse in the first optical signal. The method then detects the first pre-processed signal to form an electrical signal. A reference signal-to-noise ratio is defined as a signal-to-noise ratio of a received signal that would produce a predetermined bit error rate in the electrical signal if the signal-to-noise ratio were to be determined with the pre-processing step omitted. The reduced signal-to-noise ratio is less than the reference signal-to-noise ratio, and a bit error rate in the electrical signal is less than the predetermined bit error rate when the step of transmitting transmits at the reduced signal-to-noise ratio.

27 Claims, 12 Drawing Sheets

U.S. PATENT DOCUMENTS

| | | | | |
|---|---|---|---|---|
| 5,239,607 | A | * | 8/1993 | da Silva et al. ............ 385/122 |
| RE35,697 | E | * | 12/1997 | Grasso et al. .................. 385/24 |
| 5,793,511 | A | * | 8/1998 | Bulow ........................ 398/147 |
| 5,910,852 | A | * | 6/1999 | Fontana et al. ............. 398/185 |
| RE36,715 | E | * | 5/2000 | Taylor ........................ 398/184 |
| 6,057,950 | A | * | 5/2000 | Bergano ...................... 398/185 |
| 6,201,621 | B1 | * | 3/2001 | Desurvire et al. .......... 398/154 |
| 6,373,608 | B1 | * | 4/2002 | Desurvire et al. .......... 398/154 |
| 6,529,300 | B1 | | 3/2003 | Milton et al. |
| 6,529,601 | B1 | * | 3/2003 | Townsend ................... 380/256 |
| 6,697,575 | B1 | * | 2/2004 | Liang et al. ................ 398/104 |
| 2001/0024307 | A1 | * | 9/2001 | Franco et al. ............... 359/161 |

OTHER PUBLICATIONS

Leclerc, O. et al., "Demonstration of High Robustness to SnR Impairment in 20 Gbit/s Long-Haul Transmission Using 1.5 μ m Saturable Absorber", Electronics Letters, IEE Stevenage, GB, vol. 36, No. 23, Nov. 9, 2000, pp. 1944-1946.

Neal S. Bergano et al, "100 Gb/s Error Free Transmission Over 9100 km Using Twenty 5 Gb/s WDM Channels", OFC '96, paper PD23-2.

T. Ito et al, "6.4 Tb/s (160x40 Gb/s) WDM Transmission Experiment with 0.8 bit/s/Hz Spectral Efficiency", ECOC 2000, paper PD1.1.

Ekaterina A. Golovchenko et al, "Four-Wave Mixing in Multispan Dispersion-Managed Transmission Links", IEEE Photonics Technology letters, vol. 10, No. 10, Oct. 1988.

T. Ito et al, "Feasibility Study on Over 1 bit/s/Hz High Spectral Efficiency WDM with Optical Duobinary Coding and Polarization Interleave Multiplexing", OFC 3 97, Tull, pp. 43-45.

Neal S. Bergano et al, "Margin Measurements in Optical Amplifier Systems", IEEE Photonics Technology Letters, vol. 5, No. 3, Mar. 1993, pp. 304-306.

* cited by examiner

OPTICAL TRANSMISSION SYSTEM USING OPTICAL SIGNAL PROCESSING IN TERMINALS FOR IMPROVED SYSTEM PERFORMANCE

CROSS REFERENCE TO RELATED APPLICATIONS

This application is a divisional of U.S. application Ser. No. 09/850,600, filed May 7, 2001.

BACKGROUND OF THE INVENTION

1. Field of the Invention

The present invention relates to an optical fiber communication system that carries multiple optical signals in corresponding channels using wavelength division multiplexing technology. In particular, an improved optical receiver permits the use of lower signal-to-noise ratios in each WDM channel so that more margin is available to improve system performance.

2. Description of Related Art

The capacity of long-haul communication systems, such as "undersea" or "submarine" systems, has been increasing at a substantial rate. For example, some long-haul optically amplified undersea communication systems are capable of transferring information at speeds of 10 gigabits per second (Gbps) or greater. Long-haul communication systems, however, are particularly susceptible to noise and pulse distortion given the relatively long distances over which the signals must travel (e.g., generally 600-12,000 kilometers). Because of these long distances, these systems require periodic amplification along the transmission path. In order to maximize the transmission capacity of an optical fiber network, a single fiber is used to carry multiple optical channels known as wavelength division multiplexing (hereinafter a WDM system). For example, a single optical fiber might carry 32 individual optical signals in separate optical channels at corresponding wavelengths evenly spread in the low loss window of an optical fiber, for example between 1540-1564.8 nanometers (e.g., spread in channels on 0.8 nanometer centers).

In a fiber optic network, the fiber itself has associated nonlinearities. At high optical signal powers, the fiber induces phase shifts on the optical signal due to these fiber nonlinearities. The induced phase shifts in the optical signal correspond to wavelength modulation imposed on the optical signal. When different portions of an optical signal have different wavelengths, these different portions propagate along the transmission fiber at different velocities due to dispersion properties inherent in the fiber media. After propagation for a distance, faster portions may overtake and become superimposed on slower portions causing amplitude distortion.

To counter the induced phase shift effects of high signal powers associated with fiber nonlinearities, an optical phase modulation is sometimes imposed on the optical signal at the transmitter in what is referred to as chirped RZ (CRZ). The inherent band spread of the chirped RZ waveform imposes a limit on how closely adjacent WDM channels may be spaced and subsequently the number of channels within a particular spectral band.

Q-Factor is a measurement of the electrical signal-to-noise ratio at a receive circuit in a communication system that describes the system's bit error rate (BER) performance. Q is inversely related to the BER that occurs when a bitstream propagates through the transmission path. The BER increases at low signal-to-noise ratios (SNRs) and decreases at high SNRs. A BER below a specified rate can be achieved by designing the transmission system to provide an SNR greater than a predetermined ratio. The predetermined SNR is based on the maximum specified BER. To achieve a low BER, the SNR must be high, and this may require that the signal power be at a level that induces undesired phase distortions due to fiber nonlinearities.

Electrical signal processing such as error correction and detection techniques are also used in communications systems. Such error correction techniques are often used in wireless transmission systems to improve the BER performance and have found increasing use in optical transmission systems. Forward Error Correction (FEC) is one type of error correction which uses a redundancy code computed and inserted into the data stream at the transmitter end. At the receiver end, the data stream is processed to correct bit errors. While the need to transmit the FEC "overhead" bits along with the data negatively impacts transmission capacity of the physical transmission channel by increasing the transmitted bit rate, the net performance of the transmission system is improved with the use of FEC techniques.

SUMMARY OF THE INVENTION

A system and method is provided for transmitting and propagating closely spaced optical channels of a WDM system at lower signal-to-noise ratios than is used in known systems while maintaining the same or lower bit error rates.

An optical receiver in accordance with the present invention includes an optical pre-processor coupled between a demultiplexer and a detector. The optical pre-processor includes either an optical polarization section having a polarization rotator and an optical polarizer, a phase modulation section that includes a dispersive fiber and a phase modulator, or an amplitude modulation section that includes an amplitude modulator.

A method of communication in accordance with the present invention includes propagating an optical transmission signal at a reduced signal-to-noise ratio through a transmission media, demultiplexing the optical transmission signal into a first optical signal, and pre-processing the first optical signal to form a first pre-processed signal by either rotating a polarization of the first optical signal, compressing a pulse in the optical signal, or modulating an amplitude of a pulse in the first optical signal. The method then detects the first preprocessed signal to form an electrical signal. A reference signal-to-noise ratio is defined as a signal-to-noise ratio of a propagated signal that would produce a predetermined bit error rate in the electrical signal if the signal-to-noise ratio were to be determined with the preprocessing step omitted. The reduced signal-to-noise ratio is less than the reference signal-to-noise ratio, and a bit error rate in the electrical signal is less than the predetermined bit error rate when the step of propagating at the reduced signal-to-noise ratio.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The capacity of optical communication systems can be improved by operating the system at lower SNRs in combination with FEC technology. In particular, signals propagating through a WDM communication system with lower transmission path average power experience less nonlinear impairments. Therefore, channel spacings among WDM signals may be reduced thereby increasing system capacity.

Figure 1:
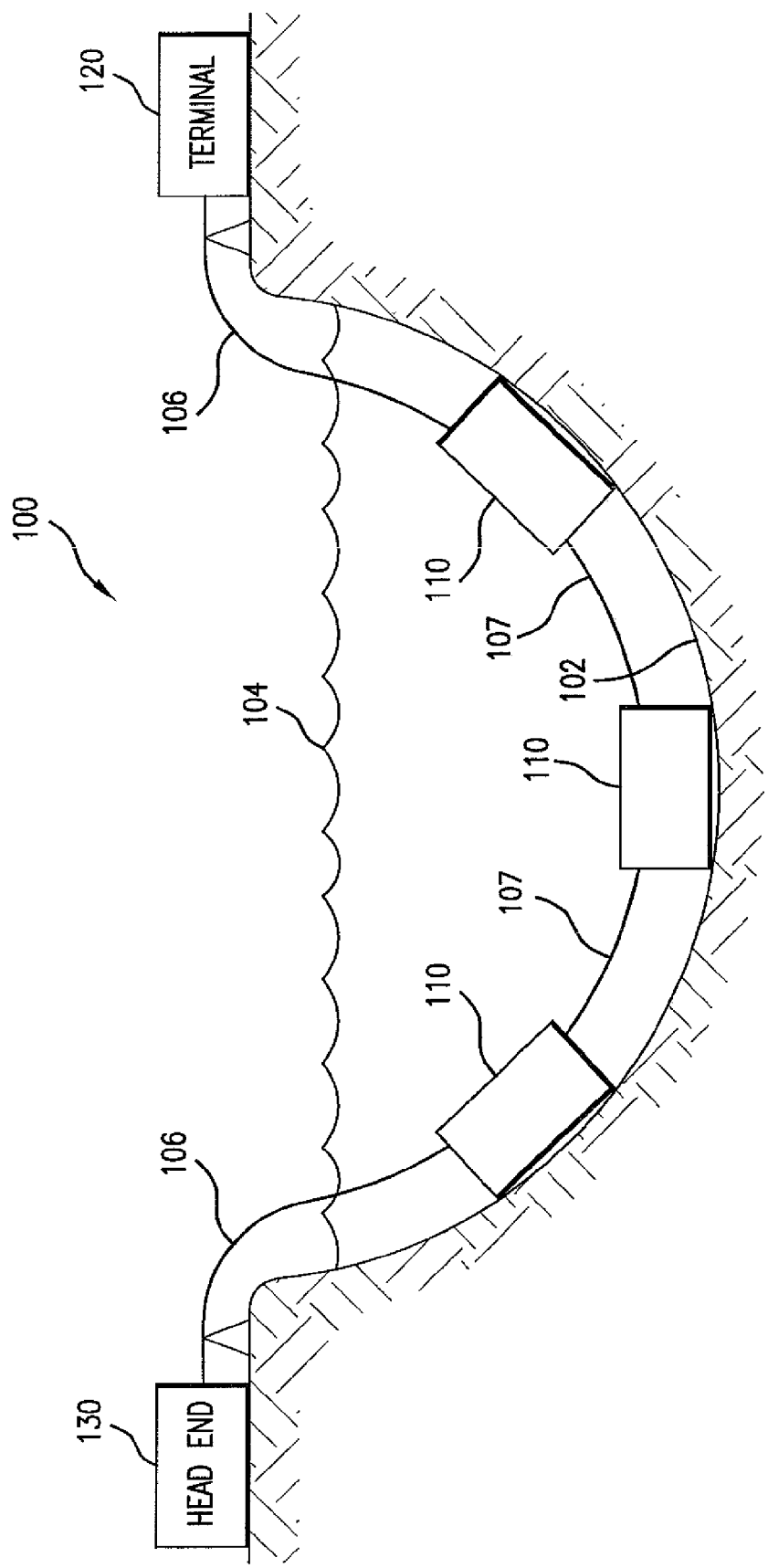
FIG. 1 is a schematic representation of a communication system of the present invention.

Referring first to FIG. 1, optical network 100 includes terminal end 130, terminal end 120 and a plurality of repeaters (optical amplifiers) 110 linked by optical cable 106 and 107. Terminal 130 and terminal 120 may each include receivers and transmitters to accommodate bidirectional transmission. In accordance with the present invention the optical signals that propagate over network 100 could do so at lower SNRs while maintaining adequate BER. In particular, the output power of each of the optical amplifiers 110 is reduced such that a signal having a lower SNR is received at a receiving end (e.g. terminal 120) of the network. As detailed below, by using signals with lower SNRs, the amount of phase modulation performed at the transmitter may be reduced, thus allowing for greater spectral efficiency and consequently greater channel capacity over a communications network.

Figure 2:
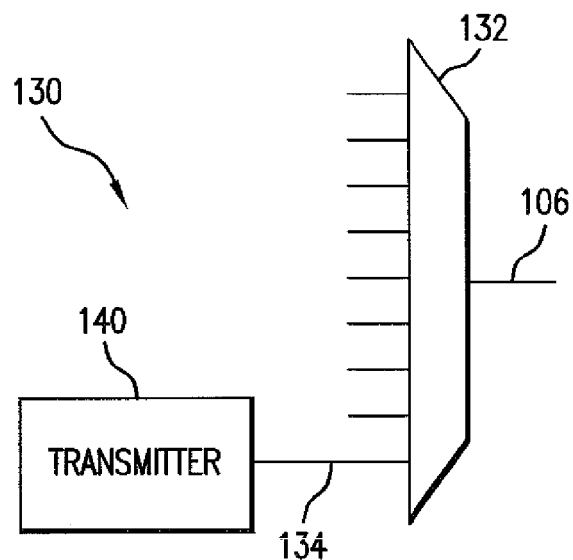
FIG. 2 is a schematic diagram of a transmitter end of the system of FIG. 1.

FIG. 2 illustrates an exemplary terminal 130 of network 100 that includes transmitter 140 and combiner or multiplexer 132. It should be understood that the exemplary transmitter may also be included in terminal 120 for bidirectional transmission. Combiner 132 combines one or more optical channels carried on respective one or more fibers 134 from respective one or more optical transmitters 140. These WDM signals propagate over network 100 via optical cable 107.

Figure 3:
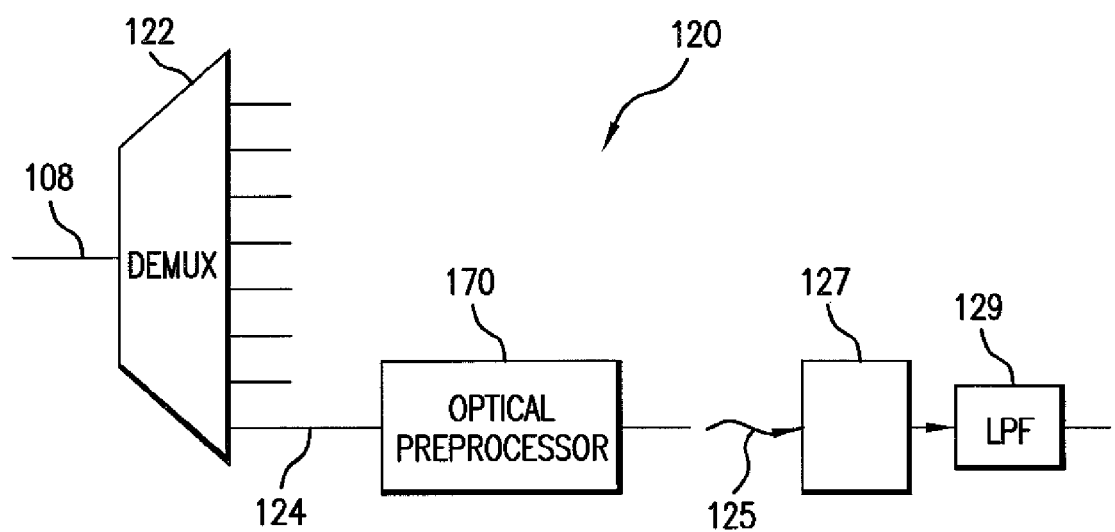
FIG. 3 is a schematic diagram of a receiver end of the system of FIG. 1.

FIG. 3 illustrates an exemplary receiver circuit included in terminal 120 of network 100 which comprises a demultiplexer 122, optical preprocessor 170, photo detector circuit 127 and low pass filter 129. It should be understood that the exemplary receiver may also be included in terminal end 130 for bidirectional transmission. Demultiplexer 122 divides terminal input signals received over cable 108 into individual wavelengths or channels. Once separated, each channel is processed through optical pre-processor circuit 170 to produce higher fidelity signal 125. Photo detector circuit receives optical signal 125 and generates an electrical signal that corresponds to the optical signal carried in a particular one of the WDM channels.

Figure 4:
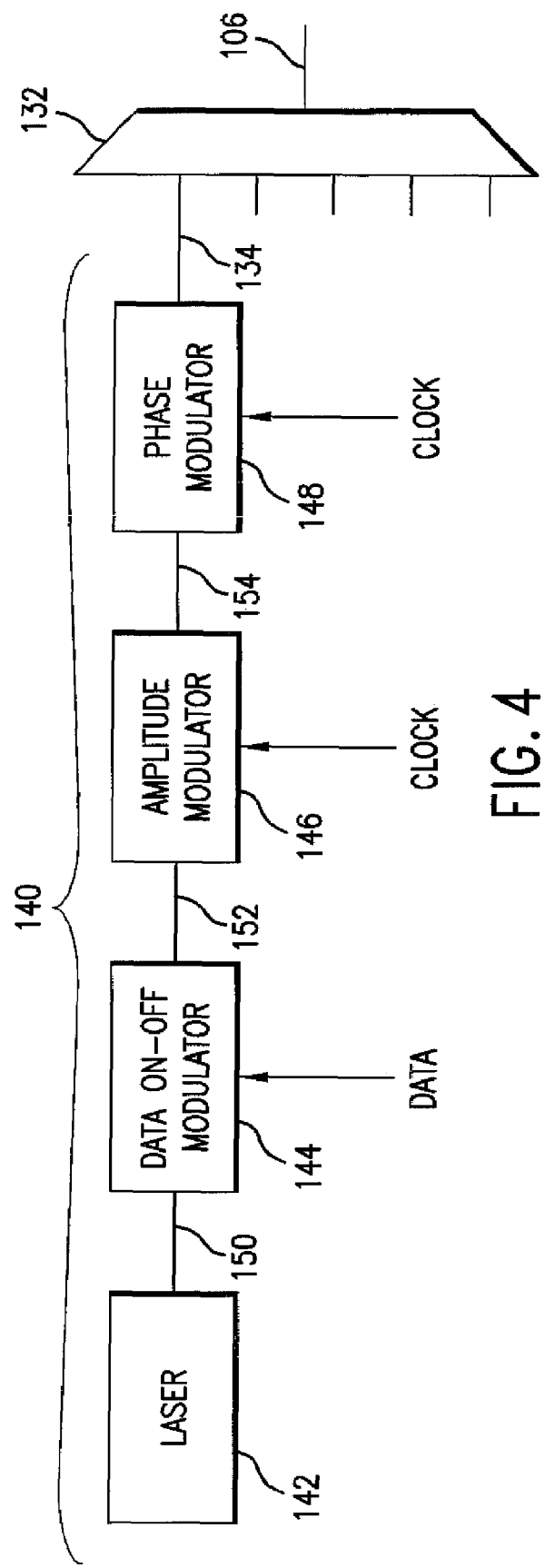
FIG. 4 is a schematic diagram of a representative transmitter of the terminal end of FIG. 3.

In order to transmit and receive optical signals long distances, certain modulation techniques are employed to provide a higher fidelity or detectable signal at the receive end. In particular, FIG. 4 illustrates transmitter 140 which includes light source 142, data modulator 144, amplitude modulator 146 and phase modulator 148. Laser or light source 142 provides a coherent light signal 150 to on-off data modulator 144 which provides optical on-off data signal 152 to amplitude modulator 146. Amplitude modulator 146 provides AM modulated (e.g., shaped) optical signal 154 to phase modulator 148. Phase modulator 148 provides an output optical signal on optical cable 134. A band pass filter (not shown) may be provided prior to wavelength multiplexer 132 to reduce inter-channel interference.

Laser source 142 provides optical signal 150 at the nominal wavelength of transmitter 140 (or some constant offset therefrom depending on the specific implementations of modulators 144, 146 and 148). For example, laser source 142 may provide optical signal 150 at a wavelength of 1541 nanometers.

Amplitude modulator 146 shapes the power envelope of optical signal 152 so as to provide shaped optical signal 154. Amplitude modulator 146 may include such shaping circuits as required to transform the clock signal input into a signal which drives the actual amplitude modulator to achieve the desired shaped optical signal.

Phase modulator 148 responds to a clock signal input to generate a "chirped" signal 134. Modulator 148 imparts an optical phase angle that is time varying thereby imparting a frequency shift (and corresponding wavelength shift). For example, phase modulator 148 may vary the instantaneous wavelength between 1540.7 and 1541.3 nanometers (i.e., a 0.6 nanometer band spread) when laser 142 is providing an optical signal at 1541 nanometers.

Figure 5A:
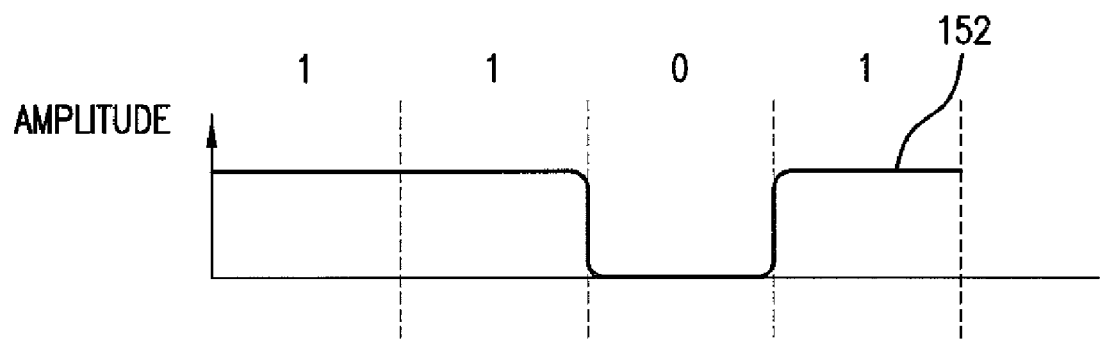
FIG. 5 is a graph depicting the chirped RZ waveforms output from the transmitter of FIG. 4.
Figure 5B:
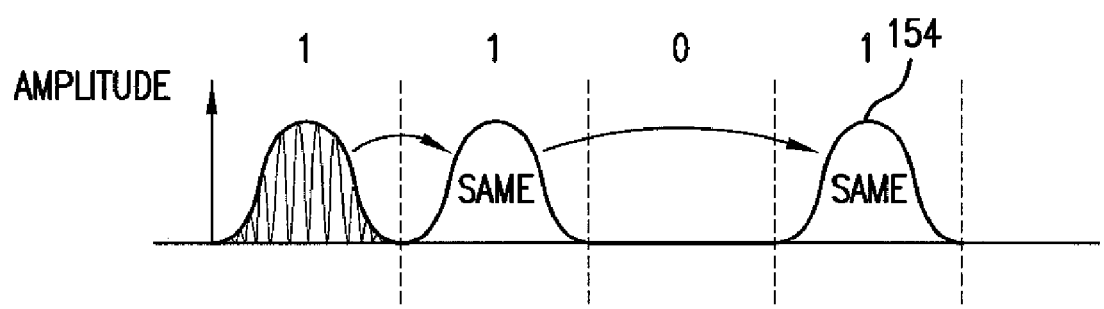

In FIG. 5A, on-off modulated optical signal 152 provided by data modulator 144 is depicted as having either on power or off power. For example, the electrical data signal provided into data modulator 144 is a bitstream of data encoded into a non-return to zero electrical signal (NRZ signal). A "one" may be represented by 5 volts, and a "zero" is represented by 0 volts. On-off modulator 144 modulates optical signal 150 to be optically "off" (e.g., no optical signal is output,) when the data bitstream into data modulator 144 is a "zero" and optically "on" (e.g., laser signal) when the data bitstream is a "one." Optical signal 152 depicts a non-return to zero (NRZ) coded optical signal (e.g., with a 100% pulse duty factor), where the four bits represent "1101." Optical signal 154, illustrated in FIG. 5B, depicts a return to zero (RZ) coded optical signal after amplitude modulator 146.

Figure 5C:
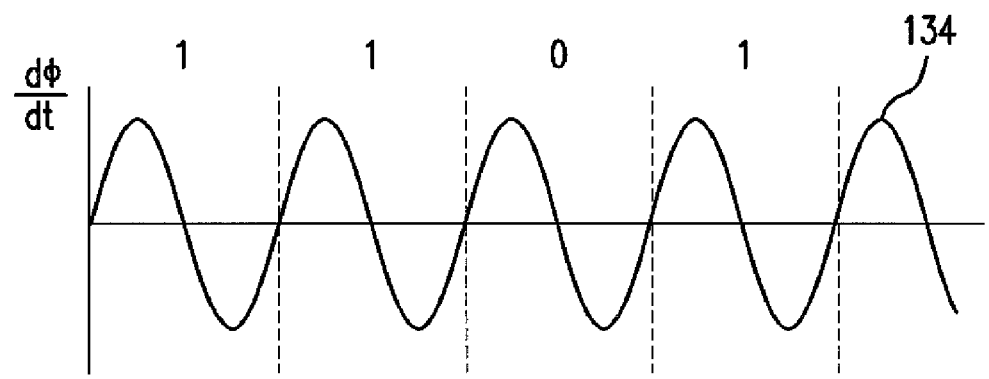

Phase modulator 148 produces a chirped optical signal 134 with a corresponding instantaneous frequency deviation shown in FIG. 5C.

Repeaters 110 interspaced along cable 107, include amplifiers that amplify the transmitted optical signals incident thereon from terminals 120 and 130. Typically, the amplifiers are erbium doped fiber amplifiers configured to provide amplification or gain at wavelengths within the low loss window of the optical fiber contained in cable 107 (e.g. 1550 nm region). These amplifiers include erbium-doped fiber that is "pumped" with light at a selected wavelength, e.g., 980 nm, which excites the erbium and amplifies the incoming optical signal. The spectral region for such amplifiers is typically between 1525 to 1573 nm. In addition to amplifying the incident optical signals, these amplifiers also add unwanted noise (amplified spontaneous emission) to the signal. As the amplified optical signal together with the noise component passes through the series of repeaters 110, this optical noise component increases after each repeater thereby reducing the signal to noise ratio of the received signal at terminals 120 or 130. Launch power as used hereinafter refers to the output of the signal including the noise component after each repeater, that is "launched" into the cable sections 106 and 107. A receiver in accordance with the present invention operates at lower SNR values while maintaining adequate bit error ratio performance. Thus, the performance of an optical communication system can be improved by using a receiver in accordance with this present invention to receive optical signals having lower SNRs (resulting from lower launch power) which reduces phase distortions associated with fiber nonlinearities. As a result, less chirp phase modulation is required to pre-compensate the optical signal so that it arrives at the receiver undistorted. Because less phase modulation is required, the bandwidth associated with each channel is minimized, which reduces inter-channel spacings, thereby allowing for the transmission of more optical channels. In this manner, a given optical system can carry more capacity over the same signal bandwidth.

By reducing the optical SNRs of the propagating signal, the SNR of the received signal is also reduced which would ordinarily lead to higher bit error rates (BERs). However, data processing techniques, such as forward error correction (FEC), enable the correction of these bit errors The loss of bandwidth associated with the use of FEC is less than the gain in data bandwidth that results from providing more data channels.

For example, assume an existing communication system that carries optical channels between a 48 nanometer band spread (1529-1577 nm) is divided into 80 optical channels spaced on 0.6 nanometer centers. Then, consider reducing the amount of phase modulation so that the channel spacing can be reduced from 0.6 nanometers to 0.5 nanometers (i.e., 20%). Then, with the channel spacing so reduced, the same 48 nanometer band spread can carry 96 optical channels.

Figure 6:
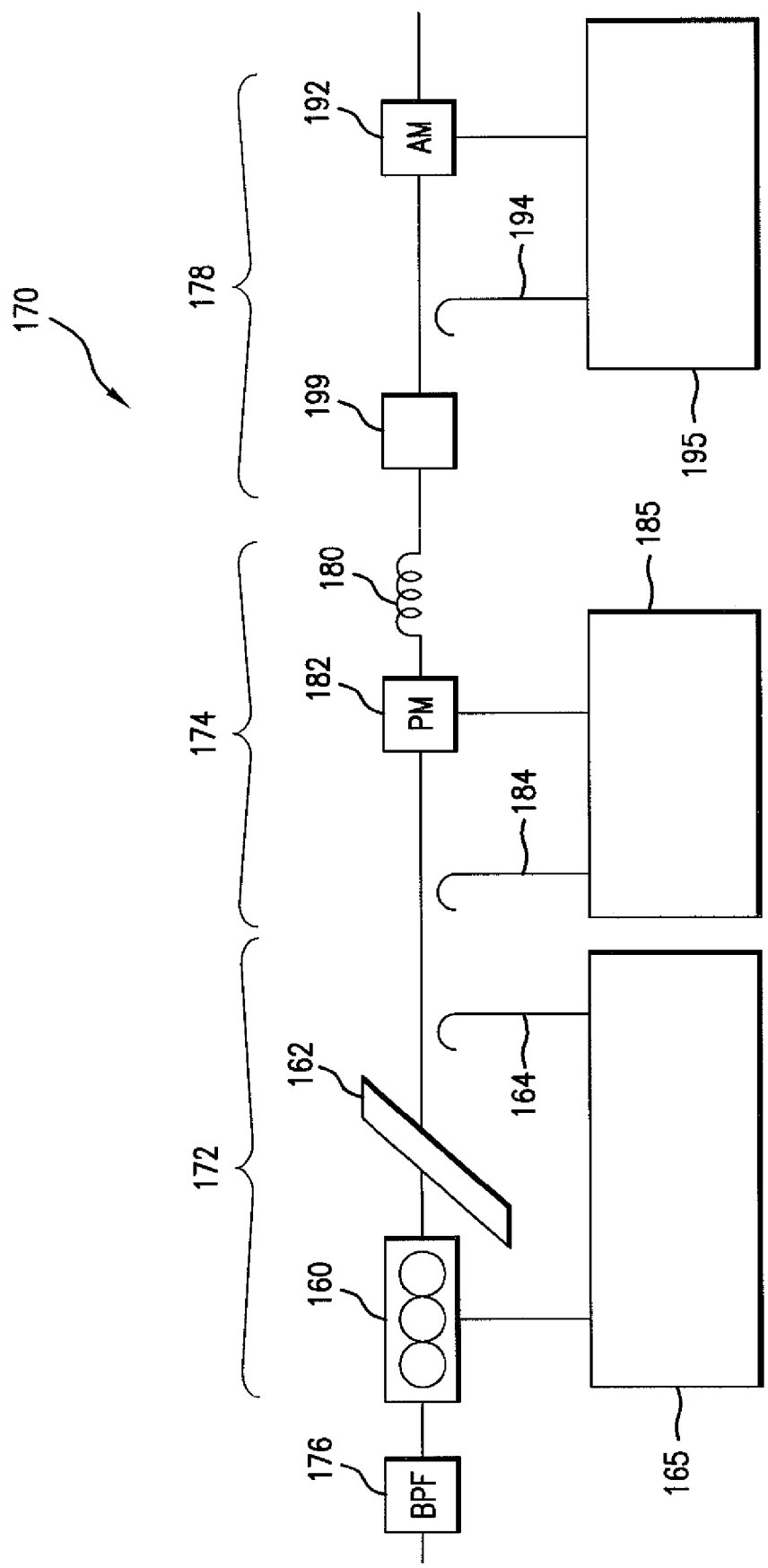
FIG. 6 is a schematic diagram of a pre-processor circuit as used in the terminal end of FIG. 2.

FIG. 6 illustrates an optical pre-processor circuit 170 associated with a receive circuit shown in FIG. 3 in accordance with the present invention. Circuit 170 includes band pass filter 176, optical polarization section 172, phase modulation section 174, and/or amplitude modulation section 178. Band pass filter 176 is configured to pass one or more optical channels received via demultiplexer 122. It is understood by those skilled in the art that the channel selection function provided by 176 could also be part of demultiplexer 122. Optical polarization section 172 includes polarization rotator 160, optical polarizer 162 and circuitry 165. Polarization rotator 160 (sometimes called a polarization controller) rotates the polarization of the input optical signal according to an input control signal received from circuitry 165. Optical tap 164 taps a portion (e.g. 5-10%) of the optical signal from polarizer 162 and supplies this signal to circuitry 165. Circuitry 165 generates a polarization control signal to control polarization rotator 160. As the polarization of the optical signal is rotated by rotator 160 the signal polarization is aligned with optical polarizer 162 to pass an associated portion of the optical signal to phase modulation section 174. Similarly, the portion of the optical signal orthogonal to polarizer 162 is not permitted to pass through polarizer 162. In this manner, the optical noise component associated with the orthogonal signal not passed through polarizer 162 is suppressed.

Transmitter 140 may be configured to take advantage of orthogonal polarization launch, where the WDM channels are launched into the system in a "pair-wise" orthogonal relationship as disclosed in U.S. Pat. No. 6,134,033 entitled "Method and Apparatus for improving Spectral Efficiency in Wavelength Division Multiplexed Transmission Systems." If pair-wise orthogonal launch is employed then polarization section 172 of preprocessor circuit 170 passes the channel to be selected and filters unwanted adjacent channels. For example, if the receiver was configured to receive channel 10 having wavelength $\lambda_{10}$, then polarization section 172 would filter adjacent circuit 170 passes the channel to be selected and filters unwanted adjacent channels. For example, if the receiver was configured to receive channel 10 having wavelength $\lambda_{10}$, then polarization section 172 would filter adjacent channels 9 having wavelength $\lambda_9$ and channel 11 having wavelength $\lambda_{11}$.

Phase modulation section 174 includes dispersion element 180, phase modulator 182 and a clock recovery circuitry 185. Dispersion element can be, for example, a length of dispersion compensating fiber. Optical tab 184 senses an optical signal in the phase modulation section and circuitry 185 receives a portion of the optical signal from section 172 via optical tap 184 and provides a control signal that is adjustable in time relative to a clock signal derived from the tapped optical signal and/or adjustable to control a phase modulation index affected by phase modulator 182. Circuitry 185 may include optical-to-electrical converter (e.g., a detector), adjustable delay circuit and driver. Alternatively, circuitry 185 could be used to provide an electrical signal to phase modulator 182 that is functionally related to the optical intensity of the signal detected at tap 184; thus providing a phase modulation dependent on the intensity of the signal. Phase modulation section 174 functions as a pulse compressor by exploiting the characteristic of dispersion element 180. Normal fiber media propagates optical signals at a rate that is dependent on the signal wavelength. The characteristic dispersion defines the rate of propagation as a function of the wavelength of the optical fiber. Dispersion element 180 has dispersion characteristics defined over particular wavelengths. For example, phase modulator 182 is controlled to impart, on the optical signal supplied by polarization section 172, a wavelength that varies from the start of the pulse to the end of the pulse as a result of modulation by phase modulator 182. Due to this variation in wavelength, there is a difference in the rate of optical signal propagation in dispersion element 180 experienced at the start of the pulse and at the end of the pulse such that the end of the pulse "catches up" with the pulse starting portion after passing through dispersion element 180. For example, by selecting the length of dispersion fiber 180 and the amount of phase modulation imparted by phase modulator 182, a 50% CRZ signal (i.e., an Full RZ signal (FRZ)) can be compressed into a 25% CRZ signal (i.e., a Half RZ signal (HRZ)_=). In fact, any reasonable compression ratio may be achieved in phase modulation section 174 when operated as a pulse compressor. A compression factor of 1.0 means no compression at all. A compression factor of 2.0 means compressing a 50% CRZ waveform into a 25% CRZ waveform. A compression factor of 3.0 means compressing a 50% CRZ waveform into a 16⅔% CRZ waveform. In general, the pulse width output from pulse compressor 174 is the pulse width into pulse compressor 174 divided by the compression factor.

The relative bit error rate performance of compressed pulses when compared to an uncompressed pulse is that the pulse compression leads to larger eye openings for better noise margin in the detection process. Narrower pulses in the channel detection process result in better channel Q due to the better eye opening. RZ pulses are better than NRZ pulses, and HRZ pulses are better than RZ pulses since HRZ pulses are narrower than RZ pulses. By compressing the input RZ pulses into narrower RZ pulses, signals with lower SNR may used without compromising the resulting bit error rate.

Figure 7:
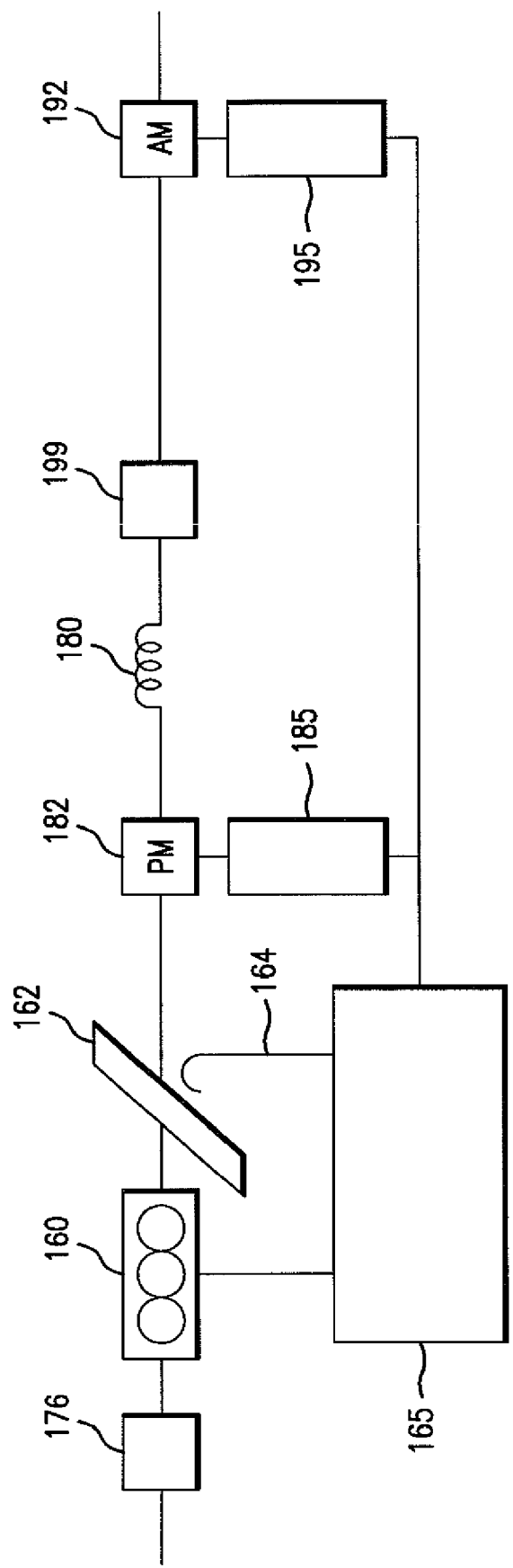
FIG. 7 is a schematic diagram of an alternative pre-processor circuit as used in the terminal end of FIG. 2.

Amplitude modulation section 178 includes amplitude modulator 192, clock recovery circuitry 195 and spectral shaping filter 199. Optical tap 194 taps a portion of the optical signal to circuitry 195 and spectral shaping filter 199. Circuitry 195 is configured to provide a control signal, based on the portion of the optical signal received via tap 194, to modulator 192. The control signal is adjustable in time relative to a clock signal derived from the tapped optical signal and/or adjustable to control an amplitude modulation index affected by the amplitude modulator. Amplitude modulator 192 may advantageously be used to further attenuate the optical signal at times in the timeline that are outside of the pulse that has been narrowed in the pulse compressor (e.g., the combination of dispersive fiber 180 and phase modulator 182 work together as a pulse compressor). Filter 199 may include a spectral weight to emphasize or de-emphasize different parts of the optical spectrum. Alternatively, circuitry 195 could be used to provide an electrical signal to amplitude modulator 192 that is functionally related to the optical intensity of the signal detected at tap 194. Even without the pulse compressor formed from the combination of dispersive fiber 180 and phase modulator 182, amplitude modulation section 178 advantageously narrows the pulse so that photo detector (FIG. 3) samples the signal power substantially in the center of the RZ pulse. Narrower pulses in the channel detection process result in better channel Q due to the better eye opening. An optical receiver that includes at least two of optical polarization section 172, phase modulation section 174 and amplitude modulation section 178 need not include duplicate optical taps. Alternatively, a single tap, e.g. 164, may be used to provide a portion of the optical signal to each of the polarization section 172, phase modulation section 174, and amplitude modulation section 178 as illustrated in FIG. 7.

The optical signal 125 supplied by optical preprocessor 170 to photodetector circuit 127 of FIG. 3 imposes a corresponding electrical field in the photodetector circuit. In particular, when optical signal 125 represents a binary "zero" (i.e. data bit), the electrical field comprises noise, hereinafter <noise>. When optical signal 125 represents a binary "one", the electrical field is comprised of a <noise> component plus a binary one, hereinafter <one>, where data modulator 144 is "on". Photodetector circuit 127 can be, for example, a square law detector of the electrical field. The output of the detector is the square root of the noise component (<noise>$^2$) when the signal represents a "zero." When the data bit is a "one", the electric field at the detector comprises <one>+<noise>, and the electrical signal output of the detector is the square root of [<one>+<noise>]$^2$, and the power detected is:

$$\text{Power}=\text{<one>}^2+2\text{<one>}\text{<noise>}+\text{<noise>}^2 \quad (1)$$

The quality Q of a channel in fiber network 100 varies inversely to the bit error rate that would otherwise be expected. Lower bit error rates will be obtained in channels of greater Q. A more detailed explanation of Q may be found in "Margin Measurements in Optical Amplifier Systems," Bergano et al., IEEE Photonics Technology Letters, Vol. 5, No. 3 March 1993. Q is given by:

$$Q = \frac{|M_1 - M_0|}{\sigma_1 + \sigma_0} \quad (2)$$

The bit error rate of the channel is then able to be determined from the channel Q by:

$$BER = \int_Q^\infty \frac{1}{\sqrt{2\pi}} e^{-\alpha^2/2} d\alpha \quad (3)$$

The term <one>$^2$ of equation (1) does not contribute to the expected standard deviation $_1$ since <one> is the deterministic value of a "one" without noise. However, the terms 2<one><noise> and <noise>$^2$ of equation (1) contribute to the expected standard deviation $_1$ since <noise> is a stochastic value that varies from measurement to measurement.

The term "2<one><noise>" in equation (1) is referred to as variance $\sigma_{S-SP}^2$ (signal spontaneous noise) and the term "<noise>$^2$" is referred to as variance $\sigma_{SP-SP}^2$ (spontaneous to spontaneous noise) The variance of all measurements of a "one" attributable to noise is designated as $\sigma_1^2$ and equals the sum of variance signal to spontaneous noise ($\sigma_{S-SP}^2$) and variance spontaneous to spontaneous noise $\sigma(_{SP-SP}^2)$. The variance of all measurements of a "zero" attributable to noise is designated as $\sigma_0^2$ and equals variance spontaneous to spontaneous noise ($_{SP\ o-SP}^2$).

Referring back to FIG. 3, when a signal is received by photodetector circuit 127, the voltage after the low pass filter 129 is measured at the center of the bit space for each received bit. After a large number of bits are measured in this way, statistical averages and variances may be computed. The arithmetic mean of all "ones" (i.e., the mean of the square root of [<one>+<noise>]$^2$) is defined to be $M_1$, and the mean of all "zeros" (i.e., the mean of <noise>) is defined to be $M_0$.

Figure 8:
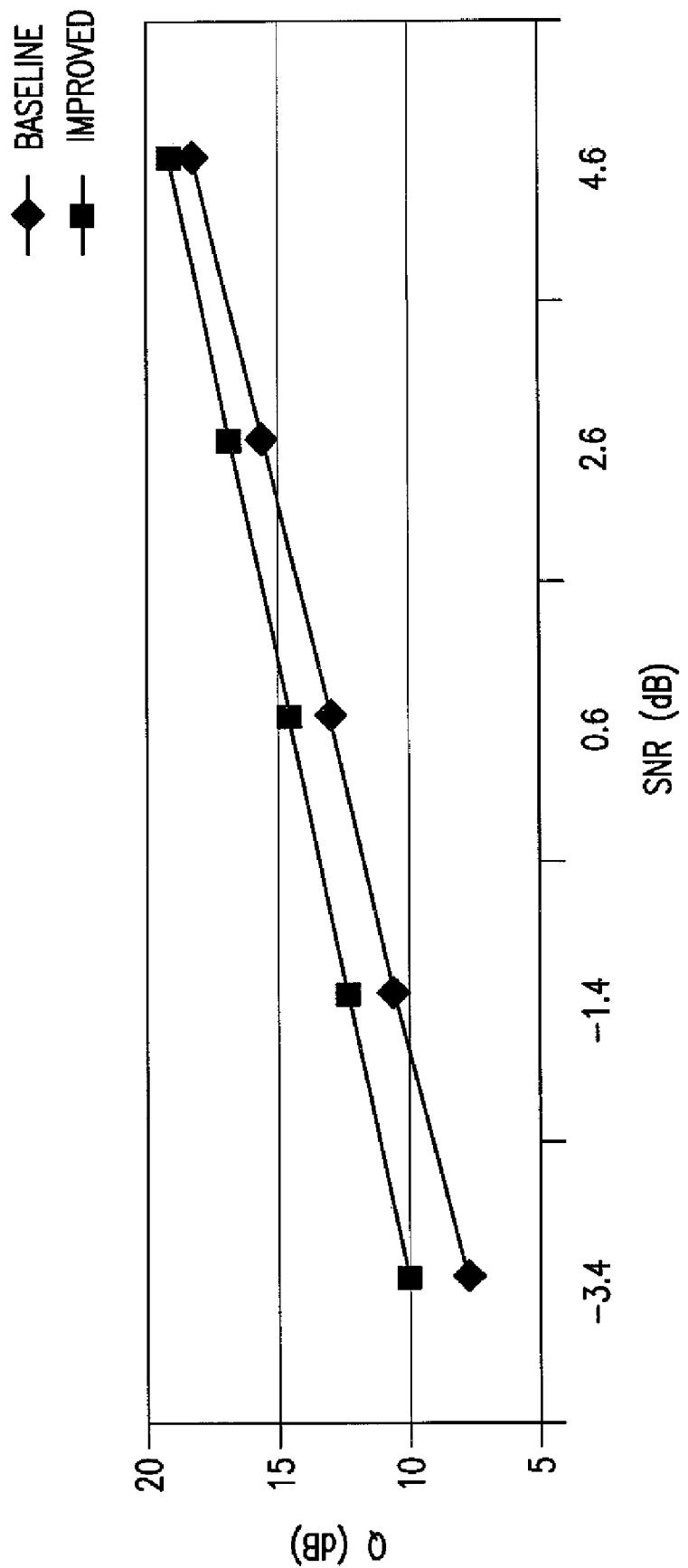
FIG. 8 is a graph depicting the simulated channel Q of the improved system compared to a baseline system as a function of signal-to-noise ratio.
Figure 9:
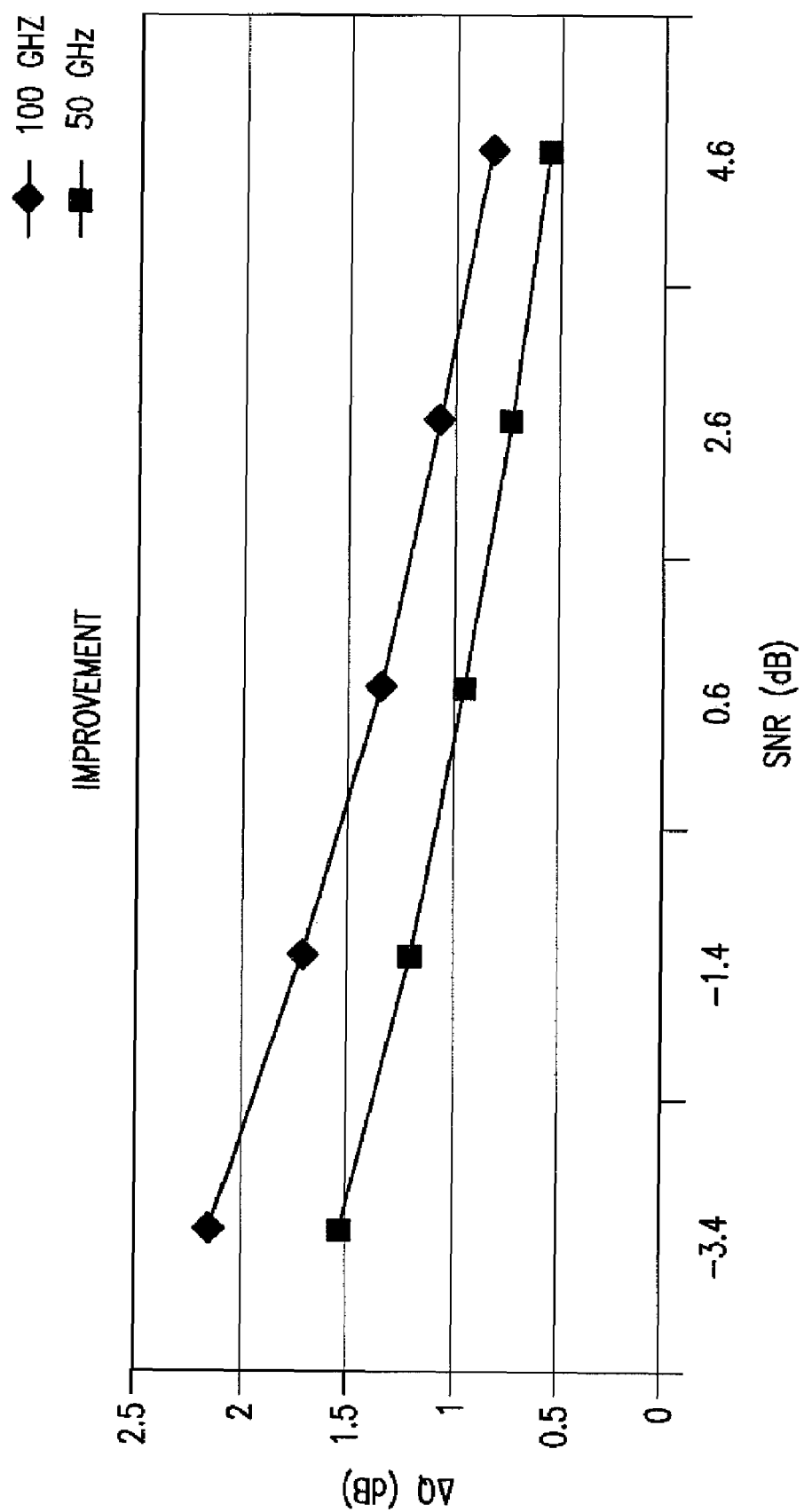
FIG. 9 is a graph depicting the gain in simulated channel Q of the improved system compared to a baseline system for a 50 GHz channel and a 100 GHz channel spacing as a function of signal-to-noise ratio.

When the effects of $\sigma_{SP-SP}^2$ noise are reduced, channel quality Q, is improved as can be seen from formula (2). This improvement becomes more significant at low SNR, because at low SNR, the effect of $\sigma_{SP-SP}^2$ noise is greatest. That is $\sigma_{sp-sp}$ is comparable to $\sigma_{s-sp}$ thereby reducing $\sigma_{sp-sp}$ and providing significant improvement in Q. As described above, preprocessor 170 reduces the effects of $\sigma_{SP-SP}^2$ noise by (i) blocking one polarization (orthogonal to the signal) using polarization section 172, and (ii) compressing the optical signal pulse in time domain by phase modulation using phase modulation section 174. FIG. 8 illustrates simulation results of Q associated with a channel with a 100 GHz optical bandpass filter carrying 10 Gb/s of data at signal-to-noise ratios (SNRs) ranging from −3.4 dB to 4.6 dB. For a baseline configuration (without optical pre-processor circuit 170), Q varies from about 7.5 dB to 18 dB. However, when improved with optical pre-processor circuit 170 with a compression factor of 2.0 and polarization suppressed, Q is (improved) and varies from about 10 dB to 19 dB. FIG. 9 illustrates the simulation results of the improvement in dB of Q for a 100 GHz optical band pass channel carrying 10 Gb/s of data with optical pre-processor circuit 170 relative to the Q for the same 100 GHz channel without optical pre-processor circuit 170. Also known is the simulation results of the improvement (increase) of Q for a 50 GHz band pass carrying 10 Gb/s of data channel with optical pre-processor circuit 170 as compared to Q associated with the same 50 GHz channel without optical pre-processor circuit 170. Both are graphed to show the results at signal-to-noise ratios (SNRs) ranging from −3.4 dB to 4.6 dB. With a 100 GHz channel, the improvement in Q from the use of optical pre-processor circuit 170 varies from 2.2 dB to 0.85 dB. With a 50 GHz channel, the improvement in Q from the use of optical pre-processor circuit 170 varies from 1.5 dB to 0.6 dB.

By using optical pre-processor circuit 170, Q associated with a WDM channel can be improved. Pulse compression from phase modulator section 174 minimizes spontaneous— spontaneous beat noise (i.e., $\sigma_{SP-SP}^2$ noise) and improves receiver sensitivity. At SNR ranges that produce Q values between 13 and 14 dB (FIG. 8), more than 1 dB of improvement in Q can be obtained by using optical pre-processor circuit 170.

With the addition of optical pre-processor circuit 170 and the attending improvement in Q, the bit error rate is reduced. For example (refer to FIG. 9), in a 100 GHz channel operating at a signal-to-noise ratio (SNR) of about 3 dB, the addition of optical pre-processor circuit 170 increases the channel Q (and therefore, lowers the bit error rate) by about 1.0 dB. The improvement in Q in a lower SNR operating environment indicates that the benefit of using pre-processor 170 is larger in a lower SNR environment as compared to a higher SNR operating environment.

Figure 10:
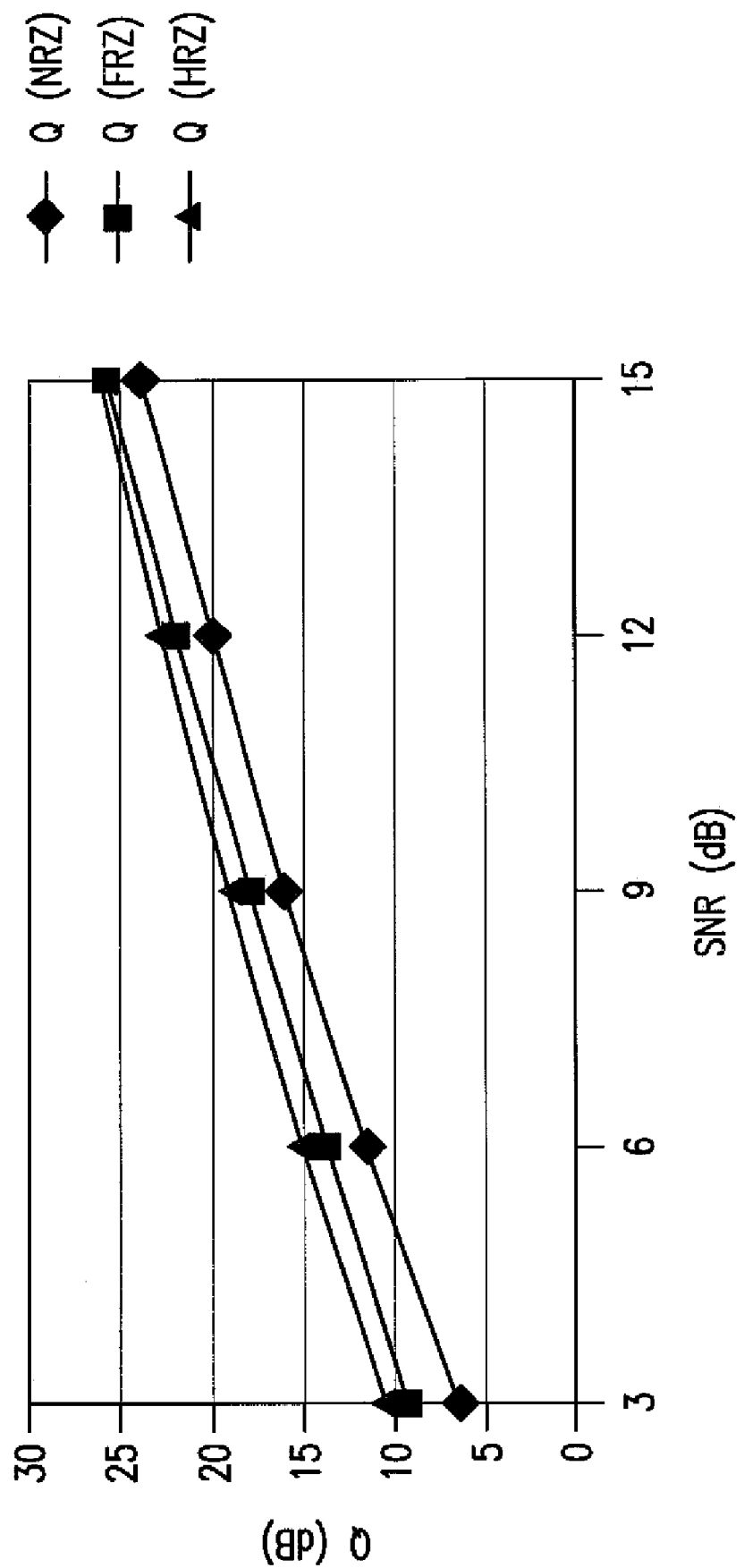
FIG. 10 is a graph depicting the simulated channel Q of a channel carrying a normal RZ, a chirp RZ (called full RZ) and a half RZ waveform as a function of signal-to-noise ratio.

FIG. 10 illustrates simulation results of Q for input signal-to-noise ratios of 3, 6, 9, 12 and 15 dB associated with three pulse compression ratios: NRZ (100% duty cycle), full RZ (50% pulse duty cycle) and half RZ (25% higher pulse duty cycle). As can be seen, the narrower RZ pulses have higher Q even though the noise bandwidth of the channel is higher. The noise bandwidth is defined by low pass filter 129 (FIG. 2) with a bandwidth, in this simulation, of 5 GHz for normal NRZ, 6 GHz for full RZ (with chirp) and 12 GHz for half RZ.

Figure 11:
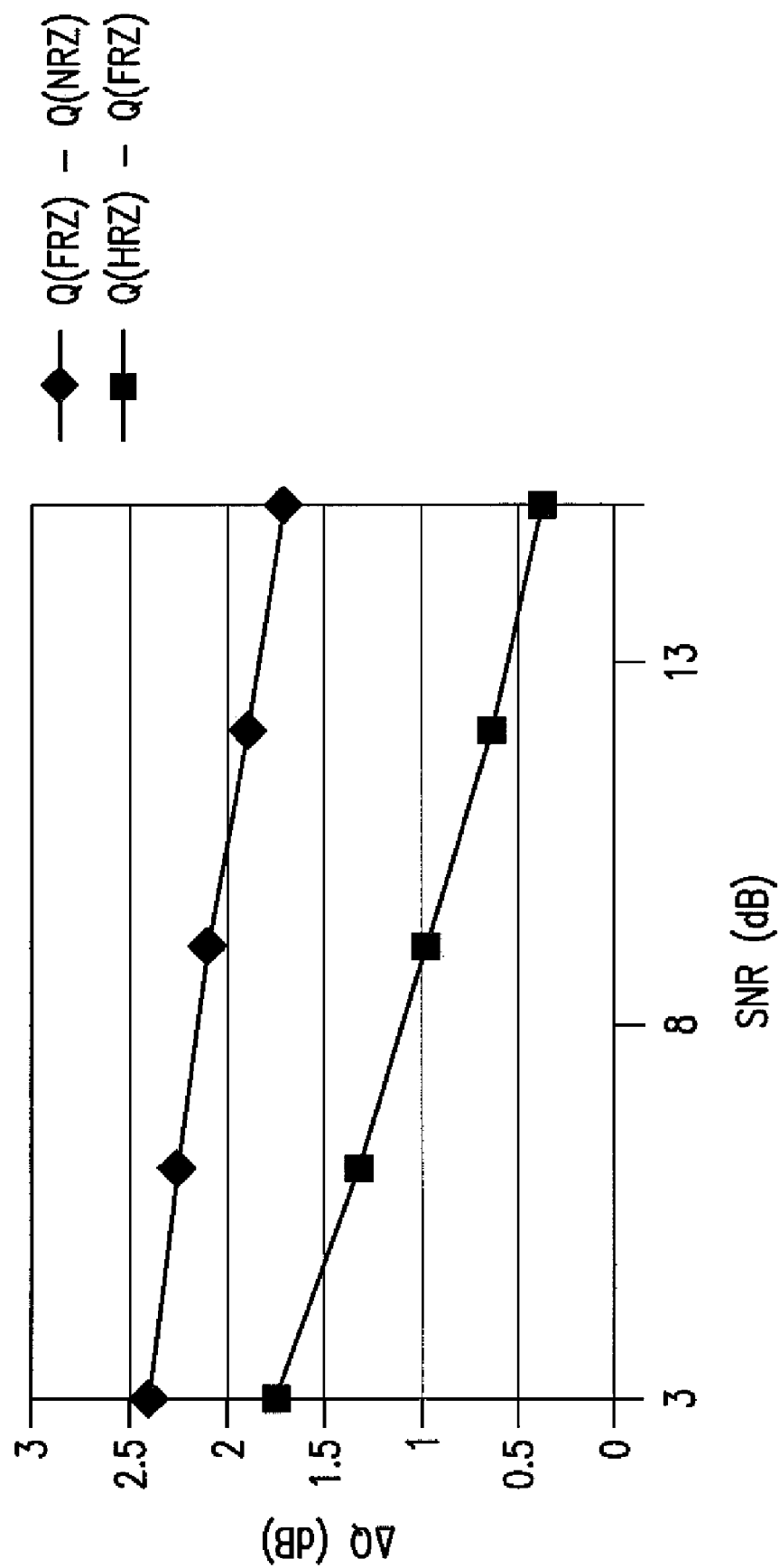
FIG. 11 is a graph depicting the gain in simulated channel Q attending a change from a normal RZ to a full RZ waveform and attending a change from a full RZ to a half RZ waveform as a function of signal-to-noise ratio.

FIG. 11 illustrates the gain in Q achieved by changing from NRZ to full RZ and the gain in Q achieved by changing from full RZ to half RZ. In particular, the Q associated with full RZ is about 1.7 dB greater than the Q associated with 1 NRZ at a high (i.e., 15 dB) SNR, and this gain in Q increases still further to about 2.4 dB when the SNR is decreased to a low (i.e., 3 dB) SNR. Similarly, Q associated with half RZ is about 0.4 dB greater than Q for full RZ at a high (i.e., 15 dB) SNR, and this gain in Q increases still further to about 1.8 dB when the SNR is decreased to a low (i.e., 3 dB) SNR. As these simulations illustrate, the improvement in Q when using optical pre-processor circuit 170 in the receiver expands at lower SNRs when compared to higher SNRs.

At a large SNR, the difference in Q between full RZ and half RZ is small; however, at a low SNR, the difference in Q between full RZ and half RZ expands as is shown in FIG. 11 where the SNR is calculated based on a bandwidth of 0.6 nanometers. Thus, the receiver in accordance with the present invention is configured to work with standard power levels, but will have a larger Q-factor enhancement in a lower SNR environment.

Forward error correction (FEC) processing technologies may be used to recover any adverse change in bit error rate, if an adverse change occurs, associated with a change from a high SNR to a low SNR. By utilizing compressed RZ signal pulses, benefits such as higher Q and lower BER are obtained in a low SNR propagating environment than compared to a high SNR environment. Thus, it is envisioned that the combination of the optical pre-processor with FEC will be useful in a low SNR operating environment.

If narrow RZ pulses are transmitted with the high peak powers associated with narrow pulses, gain in Q may be nullified with higher fiber non-linearity effects. These non-linearity effects result in a wavelength modulation imposed across the pulse width. Therefore, wider pulses are transmitted and propagated in the fiber, and pulse compression is performed at the receiver using pre-processor circuit 170.

The transmitted pulses from transmitter 140 are wider with relatively low peak power when compared to the compressed pulses associated with phase modulation section 174. In this simulation, phase modulation section 174 used 2 kilometers of dispersion compensating fiber 180 and phase modulator 182 was designed to modulate the optical phase up to two radians. Phase modulation section 174 operates to achieve various compression factors: CF=1.0 (no compression), CF=1.5, CF=2.0 and CF=3.0.

Figure 12:
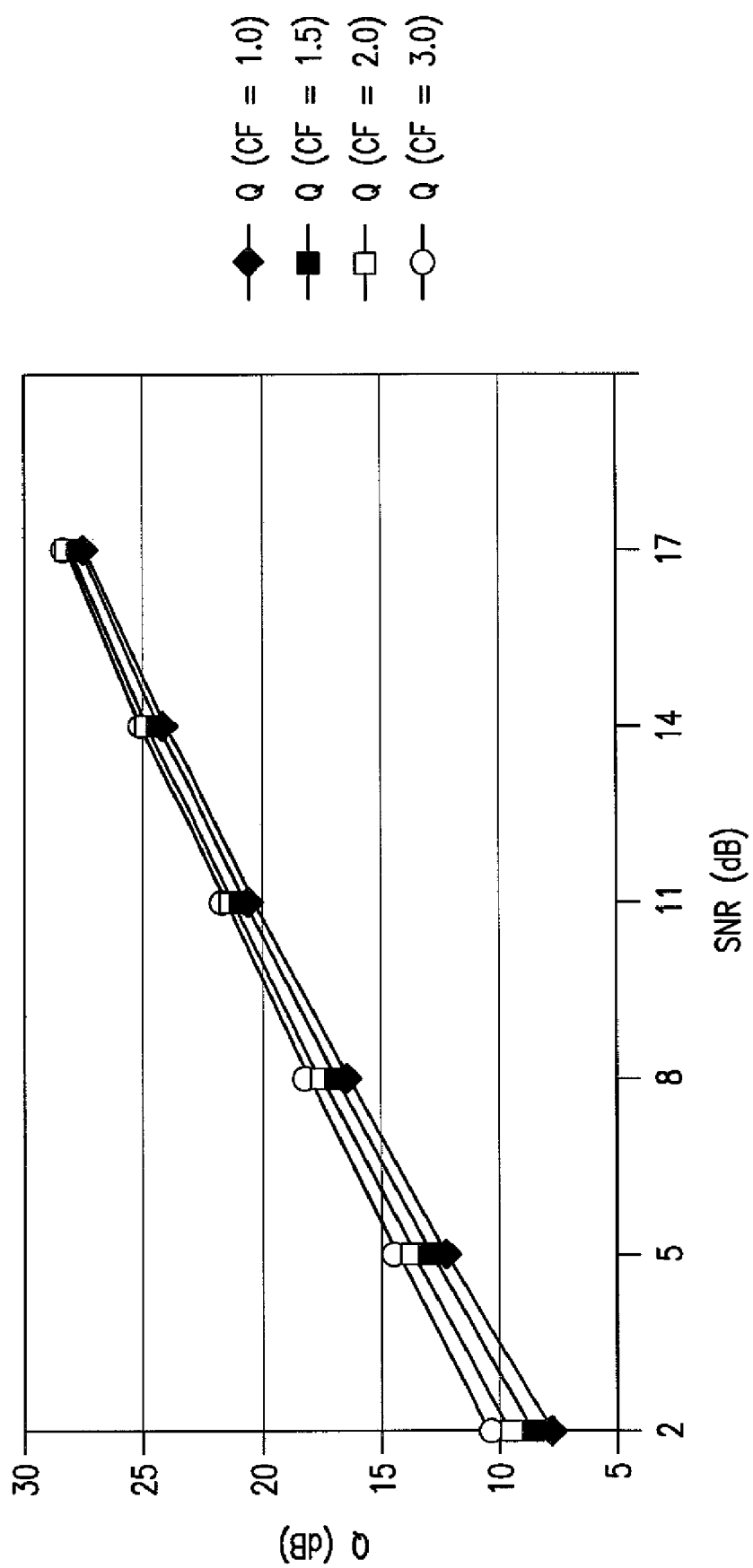
FIG. 12 is a graph depicting the simulated channel Q of a channel carrying a chirp RZ (called full RZ) waveform without compression and with receiver compression factors of 1.5, 2.0 and 3.0 as a function of signal-to-noise ratio.

FIG. 12 illustrates Q results plotted for compression factors ranging from 1.0 to 3.0 at SNRs ranging from 2 to 17 dB. In a high SNR environment, Q tends to approach a single value (about 28 dB for an SNR of 17 dB). In a low SNR environment, the higher compression factors achieve noticeably higher Q.

Figure 13:
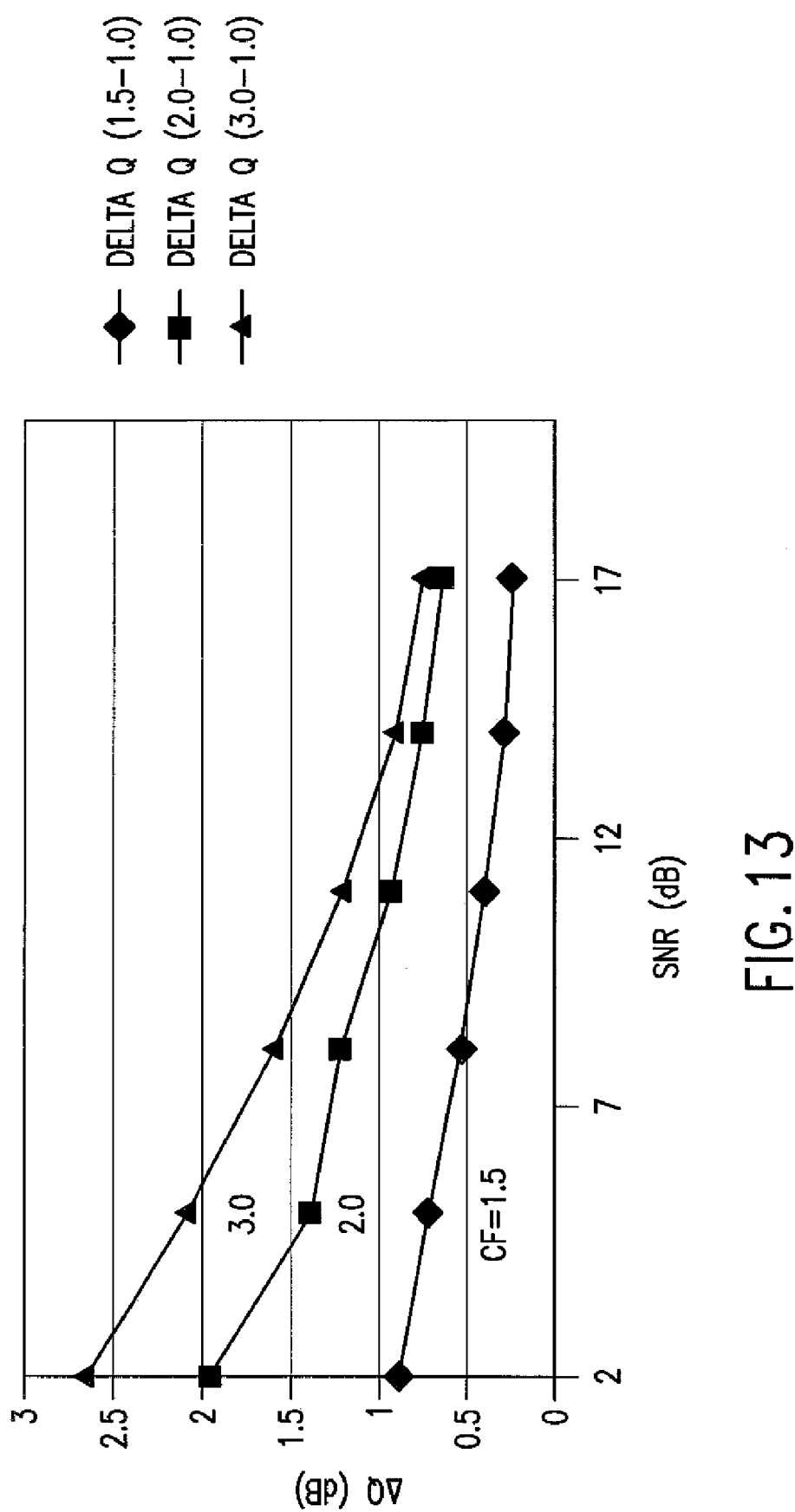
FIG. 13 is a graph depicting the gain in simulated channel Q attending a change from a chirp RZ (called full RZ) waveform without receiver compression to a chirp RZ waveform with receiver compression factors of 1.5, 2.0 and 3.0 as a function of signal-to-noise ratio.

FIG. 13 illustrates the improvement in Q over an uncompressed pulse at SNRs ranging from 2 to 17 dB plotted for compression factors of CF=1.5, CF=2.0 and CF=3.0. For example, at a compression factor of CF=3.0, more than a 2 dB improvement in Q is achieved at SNRs of less than 6 dB.

By rejecting one polarization in optical polarizer 162 (FIG. 6) and by compressing the optical pulses in phase modulation section 174 (FIG. 6), system 100 (FIG. 1) is able to maintain the same or reduced bit error rate for the desired data bit transport rate because of the improved Q achieved at the lower SNRs. In addition, the lower SNR is achieved by either transmitting or amplifying at lower peak powers. By lowering the peak power, effects of fiber nonlinearities are minimized. At the same time, the phase modulation that is imposed by phase modulator 148 (FIG. 4) to compensate for these nonlinear effects may be lessened so that the phase modulated optical signal varies over a narrower band of wavelengths. This permits adjacent channels in a wavelength division multiplex (WDM) system such as network 100 to be spaced on closer wavelength intervals.

Existing communications systems that include an existing optical receiver may be improved by replacing it with an improved optical receiver in accordance with the present invention. The improved optical receiver includes a pulse compressor to compress pulses of the propagating optical signal into a compressed pulse. Having described preferred embodiments of a novel optical transmission system using pulse compression and polarization suppression in the receiver in low SNR environment, it is noted that modifications and variations can be made by persons skilled in the art in light of the above teachings 1.) For example, one could envision replacing polarizer 162 in FIG. 6 with a partial polarizer. This could prove to be a benefit if the data signal is slightly depolarized after propagating through the transmission system. Alternatively, an optical filter may be used in combination with the amplitude modulation sections to emphasize certain parts of the optical spectrum. This could for example correct for any amplitude distortion in the received pulses. Alternatively, it may be advantageous to change the order of the data modulator, amplitude modulator and phase modulator sections depending on receiver and system configurations. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A pre-processor used in an optical receiver composing:
    an optical polarization section having a polarization rotator and an optical polarizer coupled to an output of said polarization rotator, said optical polarizer being configured to pass only a selected polarization of an optical signal output from said polarization rotator as a polarizer output; and
    an amplitude modulation section coupled to an output of said optical polarization section, said amplitude modulation section including an amplitude modulator configured for imparting an amplitude modulation to at least a portion of said polarizer output.

2. The optical receiver of claim 1, wherein the amplitude modulation section further includes a clock recovery circuit coupled to control the amplitude modulator.

3. The optical receiver of claim 2, wherein the clock recovery circuit includes:
    a tap to sense an optical signal in the amplitude modulation section; and
    circuitry to provide an amplitude modulator control signal that is at least one of adjustable in time relative to a clock signal derived from the tapped optical signal and adjustable to control an amplitude modulation index affected by the amplitude modulator.

4. The optical receiver of claim 3, wherein the circuitry to provide an amplitude modulator control signal provides the amplitude modulator control signal that is adjustable in time relative to the clock signal and adjustable to control the amplitude modulation index.

5. The optical receiver of claim 1, wherein the optical polarization section further includes a polarization feedback control circuit coupled to control the polarization rotator.

6. The optical receiver of claim 5, wherein the polarization feedback control circuit includes: a tap to sense an optical signal in the optical polarization section; and circuitry to provide a polarization control signal to control the polarization rotator based on the optical signal.

7. A method of receiving an optical signal comprising steps of:
    demultiplexing an input signal into at least one optical signal;
    pre-processing a first optical signal of the at least one optical signal to form a first pre-processed signal, the step of pre-processing including:
        rotating a polarization of the first optical signal,
        passing the first optical signal through a polarizer configured to pass only a selected polarization of the first optical signal;
        modulating an amplitude of a pulse in said selected polarization of the first optical signal; and
    detecting the first pre-processed signal to form an electrical signal,
    wherein a reference signal-to-noise ratio is defined as a signal-to-noise ratio of a received signal that would produce a predetermined bit error rate in the electrical signal if the signal-to-noise ratio were to be determined with the pre-processing step omitted;
    a reduced signal-to-noise ratio is less than the reference signal-to-noise ratio; and
    a bit error rate in the electrical signal is less than the predetermined bit error rate when said at least one optical signal is received at the reduced signal-to-noise ratio.

8. The method of claim 7, wherein the step of modulating an amplitude includes:
    recovering a clock signal from the first optical signal;
    controlling an amplitude modulator with the recovered clock signal; and
    passing the first optical signal through a dispersive fiber.

9. The method of claim 8, wherein the step of controlling an amplitude modulator includes at least one step selected from the group consisting of:
    delaying the clock signal by an adjustable delay; and
    shaping the clock signal by an adjustable shape.

10. The method of claim 8, wherein the step of controlling an amplitude modulator includes:
    delaying the clock signal by an adjustable delay; and
    shaping the delayed clock signal by an adjustable shape.

11. The method of claim 7, wherein the step of rotating a polarization includes:
    passing the first optical signal through a polarization rotator to form a rotated optical signal;
    recovering a clock signal from the rotated optical signal; and
    controlling the polarization rotator with the clock signal.

12. The method of claim 11, wherein the step of recovering a clock signal includes:
    coupling a portion of the rotated optical signal to form a tapped optical signal; and
    detecting the tapped optical signal to form the clock signal.

13. The method of claim 7, further comprising a step of transmitting the input signal through a transmission media prior to the step of demultiplexing.

14. A pre-processor used in an optical receiver comprising:
    an optical polarization section having a polarization rotator and an optical polarizer coupled to an output of said polarization rotator, said optical polarizer being configured to pass only a selected polarization of an optical signal output from said polarization rotator as a polarizer output; and
    a phase modulation section coupled to an output of said optical polarization section, said phase modulation section configured to compress at least a portion of said polarizer output and comprising a phase modulator a dispersive fiber coupled to an output of said phase modulator.

15. The optical receiver of claim 14, wherein the phase modulation section further includes a clock recovery circuit coupled to control the phase modulator.

16. The optical receiver of claim 15, wherein the clock recovery circuit includes:
    a tap to sense an optical signal in the phase modulation section; and
    control circuitry to provide a phase modulator control signal that is at least one of adjustable in time relative to a clock signal derived from the tapped optical signal and adjustable to control a phase modulation index affected by the phase modulator.

17. The optical receiver of claim 16, wherein the circuitry to provide a phase modulator control signal provides the phase modulator control signal that is adjustable in time relative to the clock signal and adjustable to control the phase modulation index.

18. The optical receiver of claim 14, wherein the optical polarization section further includes a polarization feedback control circuit coupled to control the polarization rotator.

19. The optical receiver of claim 18, wherein the polarization feedback control circuit includes:
a tap to sense an optical signal in the optical polarization section; and circuitry to provide a polarization control signal to control the polarization rotator based on the optical signal.

20. A method of receiving an optical signal comprising steps of:
demultiplexing an input signal into at least one optical signal;
pre-processing a first optical signal of the at least one optical signal to form a first pre-processed signal, the step of pre-processing including
rotating a polarization of the first optical signal,
passing the first optical signal through a polarizer configured to pass only a selected polarization of the first optical signal;
compressing a pulse in said selected polarization of the first optical signal; and
detecting the first pre-processed signal to form an electrical signal,
wherein a reference signal-to-noise ratio is defined as a signal-to-noise ratio of a received signal that would produce a predetermined bit error rate in the electrical signal if the signal-to-noise ratio were to be determined with the pre-processing step omitted;
a reduced signal-to-noise ratio is less than the reference signal-to-noise ratio; and
a bit error rate in the electrical signal is less than the predetermined bit error rate when said at least one optical signal is received at the reduced signal-to-noise ratio.

21. The method of claim 20, wherein the step of compressing a pulse includes:
recovering a clock signal from the first optical signal;
controlling a phase modulator with the recovered clock signal; and
passing the first optical signal through a dispersive fiber.

22. The method of claim 21, wherein the step of recovering a clock signal includes:
coupling a portion of the first optical signal to form a tapped optical signal; and
detecting the tapped optical signal to form the clock signal.

23. The method of claim 21, wherein the step of recovering a clock signal includes:
coupling a portion of the rotated optical signal to form a tapped optical signal; and
detecting the tapped optical signal to form the clock signal.

24. The method of claim 21, wherein the step of controlling a phase modulator includes at least one step selected from the group consisting of:
delaying the clock signal by an adjustable delay; and
shaping the clock signal by an adjustable shape.

25. The method of claim 24, wherein the step of recovering a clock signal includes:
coupling a portion of the first optical signal to form a tapped optical signal; and
detecting the tapped optical signal to form the clock signal.

26. The method of claim 20, wherein the step of rotating a polarization includes:
passing the first optical signal through a polarization rotator to form a rotated optical signal;
recovering a clock signal from the rotated optical signal; and
controlling the polarization rotator with the clock signal.

27. The method of claim 20, further comprising a step of transmitting the input signal through a transmission media prior to the step of demultiplexing.

* * * * *